3,282,874
METHOD FOR DISSOLVING WATER-SOLUBLE POLYMERS
Ralph E. Friedrich and Rex G. Martin, Midland, Mich., assignors to The Dow Chemical Company, Midland, Mich., a corporation of Delaware
No Drawing. Filed Dec. 30, 1963, Ser. No. 334,601
4 Claims. (Cl. 260—29.2)

The present invention concerns an improved method for dissolving water-soluble organic polymers in water, and more particularly the invention concerns the preparation of aqueous polymer concentrates which have utility as plugging media.

It has generally been recognized that, unless especially treated, finely divided, water-soluble organic polymers inclusive of synthetic organic polymers and natural gums must be dissolved in water under carefully controlled conditions. Otherwise, difficultly dispersed lumps of surface wet polymer, sometimes referred to as "fish eyes," are formed. The fish eyes will swell and ultimately dissolve, but this requires a long period of time. Although several techniques are known for achieving fast and uniform dispersion, with resulting solution, of particulate water-soluble polymers in water, most of the known techniques are applicable only to the preparation of dilute polymer solutions, e.g., containing less than about 5 percent by weight of the polymer.

Aqueous polymer concentrates, or polymer gels as they are more frequently called, have a variety of uses which make their preparation from particulate polymers desirable. Among such uses is their convenient physical adaptation as plugging agents.

It would be desirable, and it is an object of the present invention, to provide a novel method for preparing uniform aqueous solutions of finely divided, solid polymers. Particularly it is an object to provide a method for preparing uniform concentrated solutions of polymer as well as dilute solutions thereof. Additional objects are providing plugging media for tanks and partitioning media for separating liquids pumped through pipe lines. These and other benefits, as will become apparent hereinafter, are accomplished in the present invention.

The fundamental invention involves the method for dissolving a finely divided, solid organic polymer in water which comprises the steps of dispersing the polymer in an inert, water-immiscible organic liquid which is a non-solvent for the polymer. After dispersing the particulate polymer throughout the organic liquid, water is mixed with the dispersion whereby the dispersed solid polymer particles swell. As sufficient water is added, the swollen polymer particles ultimately coalesce to form a visually discrete phase of a uniform aqueous polymer solution. This solution, depending upon the amount of polymer present therein, has a viscosity from a comparatively thin syrup-like liquid, at low polymer concentrations, up to gels of substantial physical strengths, at high polymer concentrations. The solutions may contain any amount of polymer from as little as 0.001 percent up to as much as 80 percent by weight polymer. The solutions are separated from the organic liquid in any convenient manner, e.g., by decanting one liquid layer. The organic liquid may be either on top of or subjacent to the aqueous layer depending upon the specific gravity of the respective liquid layers.

If desired, the polymer solution is readily diluted to any lesser polymer concentration by the further addition of water. Once the polymer is thoroughly wetted, the problem of solid polymer agglomeration or "fish eyes" is avoided. Occasionally it may be advantageous to remove the last traces of the organic liquid from the polymer solution. This can be done by heating the solution up to its boiling point to flash off the residual organic liquid.

A preferred embodiment of the invention involves first preparing a dispersion of the finely divided, solid, water-soluble organic polymer in an organic liquid as described above and then adding the water to the dispersion as a suspension thereof in a second body of an organic liquid. The latter liquid, like the organic liquid used to prepare the polymer dispersion, is inert to the polymer, water-immiscible and a non-solvent for the polymer. It is also further characterized by solubility, or miscibility, in the polymer-organic liquid dispersion. Thus, it is clear the second body may be the same organic liquid as is used in preparing the polymer dispersion, or a different one, provided it meets the specified requirements. While a suitable suspension of water in the second organic liquid body can be prepared simply by subjecting the admixture thereof to severe agitation, it is best to utilize a small amount of a suitable suspending agent sufficient to promote the suspension of water in the organic liquid. One such agent is a high molecular weight, water-soluble polyalkane polymer, e.g., having a molecular weight of at least about one million. If the ultimate utilization of the polymer solution will tolerate them, surface active agents, such as the alkyl aryl sulfonates and fatty acid soaps, can be used to promote the uniform suspension of water in the organic liquid. Water-soluble cellulose ethers such as methyl cellulose, carboxymethyl cellulose and hydroxyethyl cellulose are also effective for this purpose.

By operating in the foregoing preferred manner, it is possible to add the water to the polymer dispersion without regard to the rate of addition thereof. Otherwise, when adding the water directly to the polymer dispersion, best results usually require the uniform distribution of the water throughout the polymer dispersion as by rapidly agitating the dispersion as the water is poured into it.

Organic liquids conveniently utilized for the purpose of dispersing the polymer therein include the various aromatic and aliphatic hydrocarbons including benzene, toluene, xylene, octane, nonane, decane, and a variety of petroleum fractions such as naphtha, gasoline, kerosene, lubricating oil and various other liquid hydrocarbons including crude petroleum. Also among the water-immiscible organic liquids useful in the invention are the halogenated aromatic and aliphatic solvents. These materials are more dense than water and the above hydrocarbons and thus provide a carrier whereby the polymer gel can be formed as a localized subsurface liquid layer. Included among these materials are the mono- and dichlorobenzenes, mono- and dibromobenzenes, carbon tetrachloride, methylene chloride, 1,1,1-trichloroethane, chloro- and bromohexane, dichloro- and dibromobutane, and the like halogenated hydrocarbons. Water-immiscible ketones and ethers such as ethyl hexyl ketone, dibutyl ketone, diethyl ether, dibutyl ether and the like liquid organic solvents can also be used.

In general, any liquid, organic material which is water-immiscible and inert to the polymer, which is to be dissolved in water, can be employed as the dispersing medium. It is liquid if it has substantial fluidity at 20° C. "Inert" means simply that the organic material does not enter into a chemical reaction with the polymer under the conditions which the two materials are brought together for the purposes of the invention. The organic liquid must also be a non-solvent for the polymer. By this is meant that the water-soluble polymer is not soluble in all proportions in the organic liquid. Thus an organic liquid which dissolves some of the polymer up to a finite concentration can be used in the invention. This is due to the fact that once the organic liquid is saturated, additional polymer will disperse therein as a solid phase.

For best results, however, the organic liquid dispersing medium should dissolve no more than about 10 percent, preferably no more than 1 percent, of its own weight of the water-soluble polymer to be dispersed.

The following operations illustrate the manner of carrying out the invention, including the preferred mode of operation for preparing aqueous concentrates of finely divided, solid, organic polymers soluble in water.

Nine grams of a finely ground, water-soluble polyacrylamide was dispersed in 200 milliliters of toluene. To the resulting mixture was slowly added 9 grams of water with stirring. As the water was added, the solvated polymer particles coalesced to provide a layer of clear solution subjacent to the toluene. The supernatant toluene was decanted and the solution recovered. This solution was a visually uniform polymer gel. It was readily dilutable with water to provide a homogeneous solution of the polymer in any desired lesser concentration.

In a second operation according to the preferred mode for adding water, the water for the polymer solution was first dispersed in a second body of an organic liquid of like nature to that in which the polymer was dispersed. Particularly 5 grams of a powdered water-soluble polyacrylamide was dispersed in 50 milliliters of methylene chloride. A water suspension was prepared by dispersing 5 milliliters of water in 30 milliliters of methylene chloride, using a small amount of a water-soluble partially sulfonated polyvinyltoluene to aid in achieving and maintaining the suspension of water. The resulting water suspension was poured rapidly into the polyacrylamide dispersion whereby uniform swelling and solvation of the polymer occurred to form a disperse aqueous solution of the polymer. Subsequent stirring of the admixture coalesced the aqueous polyacrylamide into a liquid gel on the surface of the methylene chloride. The polymer solution gel is readily separated from the surface of ethylene chloride, e.g., as by withdrawing methylene chloride at the bottom of the container.

In addition to the foregoing, the invention is most useful in achieving solubilization of water-soluble polymers such as sodium polystyrene sulfonates, potassium polyacrylate, polyvinyl alcohol, water-soluble methyl cellulose, hydroxyethyl cellulose, and methyl hydroxypropyl cellulose, as well as any other of the water-soluble organic polymers obtained in a finely divided, particulate form.

The finely divided, water-soluble organic polymers employed herein are usually essentially linear in structure but may be branched polymers or graft copolymers. Also the polymers may be moderately cross-linked with interpolymerized amounts of polyunsaturated monomers but the greatest advantage is achieved when dissolving essentially linear, water-soluble polyalkanes in accordance with the invention. The essential requirement of polymers to which the invention is applicable is the property of water solubility, which herein means homogeneously dispersible in water to provide a visually continuous and transparent solution.

A preferred class of polymers encompasses polyalkanes obtained by the polymerization of monoolefinically unsaturated monomers, the polyalkane having a plurality of substituent hydrophilic groups selected from carboxylate and sulfonate groups, i.e., alkali metal and ammonium carboxylate and sulfonate moieties.

While solutions of any desired polymer concentration can be prepared up to the saturation concentration level of the polymer in water, the invention has its greatest advantage in preparing concentrated solutions or gels of the water-soluble polymers. These gels usually contain anywhere from about 5 percent up to as much as 80 percent by weight dissolved polymer. Most frequent use is made of aqueous polymer gels containing from about 5 up to 20 percent by weight polymer.

The aqueous polymer gels prepared in accordance with the present invention can be used in plugging metal tanks and pipes. The tank or pipe is filled with the organic liquid and the polymer is introduced therein with agitation. Thereafter, sufficient water is added to the resulting dispersion of the polymer in the organic liquid to provide an aqueous polymer gel of desired polymer concentration. The two-phase system resulting from this treatment is maintained under a pressure, and optionally further agitation, until the polymer gel is forced into leaking crevices or other perforations of the tank or pipe. A somewhat analogous but different application for the aqueous polymer gels involves coating the gels on earthen formations to render them impermeable to liquids. For instance, an earthen oil tank is prepared by digging a pit and coating its sides and bottom with a thin layer of the aqueous gel.

What is claimed is:

1. A process for dissolving a finely divided, solid, water-soluble organic polymer in water which comprises the steps of dispersing the preformed organic polymer in an inert, water-immiscible, organic liquid which is a non-solvent for the polymer and mixing water with the organic liquid-polymer dispersion in the form of a suspension of the water in a second body of an inert, water-immiscible, organic liquid, which is a non-solvent for the polymer and which second body of organic liquid is further characterized by solubility in the organic liquid-polymer dispersion, the amount of said water being sufficient to provide an aqueous polymer solution of a predetermined concentration.

2. A method of plugging leaks in a vessel which comprises introducing into the vessel a mixture of (A) a dispersion of a finely divided, water-soluble, preformed organic polymer in an inert, water-immiscible, organic liquid, which is a non-solvent for the polymer and (B) a suspension of water in a second body of inert, water-immiscible, organic liquid which is a non-solvent for the polymer and which second body of organic liquid is further characterized by solubility in the organic liquid-polymer dispersion, the amount of said water incorporated into the dispersion of the polymer being sufficient to form an aqueous polymer gel.

3. A method as in claim 2 and including the additional step of maintaining the mixture of components (A) and (B) under substantial elevated pressure while agitating the dispersion.

4. A method as in claim 2 wherein the amount of water incorporated is sufficient to produce an aqueous polymer gel having from about 5 up to about 80 percent by weight polymer.

References Cited by the Examiner

UNITED STATES PATENTS 2,757,153    7/1956    Bowen _____ 260—29.6
2,837,122    6/1958    Shaw et al. _____ 106—33

MURRAY TILLMAN, *Primary Examiner.*
W. J. BRIGGS, SR., *Assistant Examiner.*